United States Patent
Okuda et al.

(10) Patent No.: US 6,771,450 B1
(45) Date of Patent: Aug. 3, 2004

(54) METHOD OF WRITING SERVO SIGNAL ON MAGNETIC TAPE

(75) Inventors: Shinsuke Okuda, Tochigi (JP); Takashi Ishii, Tochigi (JP)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 09/890,996
(22) PCT Filed: Feb. 17, 1999
(86) PCT No.: PCT/JP99/00689
§ 371 (c)(1), (2), (4) Date: Mar. 25, 2002
(87) PCT Pub. No.: WO00/49605
PCT Pub. Date: Aug. 24, 2000

(51) Int. Cl.[7] .............................................. G11B 21/02
(52) U.S. Cl. ...................................................... 360/75
(58) Field of Search .............................. 360/75, 69, 70, 360/71, 73.01, 73.02, 73.04, 73.05, 73.07, 74.2, 74.4, 74.5, 74.6, 48, 77.12, 77.13

(56) References Cited

U.S. PATENT DOCUMENTS

| | | |
|---|---|---|
| 2,923,781 A | 2/1960 | Gordon et al. |
| 3,404,392 A | 10/1968 | Sordello |
| 3,426,337 A | 2/1969 | Black et al. |
| 3,637,991 A | 1/1972 | Yanagawa |
| 3,662,120 A | 5/1972 | Hess |
| 3,768,752 A | 10/1973 | Bettini et al. |
| 3,790,755 A | 2/1974 | Silverman |
| 3,838,291 A | 9/1974 | Marion et al. |
| 3,914,793 A | 10/1975 | Burnham |
| 3,916,039 A | 10/1975 | Akashi et al. |
| 3,980,480 A | 9/1976 | Laridon et al. |
| 4,008,085 A | 2/1977 | Lemahieu et al. |
| 4,123,788 A | 10/1978 | Kruger |
| 4,176,381 A | 11/1979 | de Niet et al. |
| 4,275,425 A | 6/1981 | Watanabe et al. |
| 4,313,143 A | 1/1982 | Zarr |
| 4,315,283 A | 2/1982 | Kinjo et al. |
| 4,340,305 A | 7/1982 | Smith et al. |
| 4,371,904 A | 2/1983 | Brooke |
| 4,380,032 A | 4/1983 | Pfost |
| 4,424,111 A | 1/1984 | Zielke et al. |
| 4,558,383 A | 12/1985 | Johnson |
| 4,570,191 A | 2/1986 | Di Stefano et al. |
| 4,578,311 A | 3/1986 | Ishikuro et al. |
| 4,626,469 A | 12/1986 | Yamaguchi et al. |
| 4,633,451 A | 12/1986 | Ahn et al. |
| 4,649,351 A * | 3/1987 | Veldkamp et al. .......... 359/349 |
| 4,679,104 A | 7/1987 | Dahlerud |
| 4,737,877 A | 4/1988 | Krongelb et al. |
| 4,746,542 A | 5/1988 | Chino et al. |
| 4,750,067 A | 6/1988 | Gerfast |
| 4,802,030 A | 1/1989 | Henry et al. |
| 4,816,939 A | 3/1989 | Ford et al. |
| 4,816,941 A | 3/1989 | Edel et al. |

(List continued on next page.)

FOREIGN PATENT DOCUMENTS

| | | |
|---|---|---|
| CH | 586 944 | 4/1977 |
| DE | 24 06 292 | 8/1975 |
| DE | 26 16 362 | 11/1977 |

(List continued on next page.)

*Primary Examiner*—David Hudspeth
*Assistant Examiner*—Fred F. Tzeng
(74) *Attorney, Agent, or Firm*—Morrison & Foerster LLP

(57) ABSTRACT

A method of writing servo signals on magnetic tape which comprises making a single laser beam (15) pass through a diffraction element (14) to split it into a plurality of beams (16) traveling in prescribed directions and then making the plurality of beams (16) pass through an optical convergence system (21) to form converged beam spots on a site of a magnetic tape (1) which is capable of forming servo tracks, the magnetic tape (1) being running at a prescribed speed, to cause the site to change physically or chemically thereby forming a plurality of servo tracks (S) in the longitudinal direction of the tape simultaneously.

5 Claims, 2 Drawing Sheets

U.S. PATENT DOCUMENTS

| | | |
|---|---|---|
| 4,843,494 A | 6/1989 | Cronin et al. |
| 4,848,698 A | 7/1989 | Newell et al. |
| 4,868,046 A | 9/1989 | Moriizumi et al. |
| 4,876,886 A | 10/1989 | Bible et al. |
| 4,884,260 A | 11/1989 | Bouldin et al. |
| 4,935,835 A | 6/1990 | Godwin et al. |
| 4,937,810 A | 6/1990 | Drexler et al. |
| 4,958,245 A | 9/1990 | Roth et al. |
| 4,961,123 A | 10/1990 | Williams et al. |
| 4,969,058 A | 11/1990 | Williams et al. |
| 4,983,496 A | 1/1991 | Newell et al. |
| 5,008,765 A | 4/1991 | Youngquist |
| 5,016,240 A | 5/1991 | Strandjord et al. |
| 5,038,030 A | 8/1991 | Hayashi et al. |
| 5,050,017 A | 9/1991 | Carr et al. |
| 5,065,387 A | 11/1991 | Roth et al. |
| 5,067,039 A | 11/1991 | Godwin et al. |
| 5,097,351 A | 3/1992 | Kramer |
| 5,105,322 A | 4/1992 | Steltzer |
| 5,108,184 A * | 4/1992 | Brown et al. ............... 356/510 |
| 5,120,927 A | 6/1992 | Williams et al. |
| 5,121,371 A | 6/1992 | Farnsworth et al. |
| 5,163,032 A | 11/1992 | Van Nieuwland et al. |
| 5,179,463 A | 1/1993 | Kramer |
| 5,196,297 A | 3/1993 | Dombrowski et al. |
| 5,196,969 A | 3/1993 | Iwamatsu et al. |
| 5,199,024 A * | 3/1993 | Taki et al. ............... 369/275.5 |
| 5,210,672 A | 5/1993 | Ivers et al. |
| 5,229,620 A | 7/1993 | Pahr |
| 5,262,908 A | 11/1993 | Iwamatsu et al. |
| 5,279,775 A | 1/1994 | Thomas et al. |
| 5,280,402 A | 1/1994 | Anderson et al. |
| 5,283,773 A | 2/1994 | Thomas et al. |
| 5,311,378 A | 5/1994 | Williams et al. |
| 5,319,507 A | 6/1994 | Umebayashi et al. |
| 5,322,987 A | 6/1994 | Thomas et al. |
| 5,333,091 A | 7/1994 | Iggulden et al. |
| 5,349,484 A | 9/1994 | Koehler |
| 5,363,255 A | 11/1994 | Ivers et al. |
| 5,369,631 A | 11/1994 | Hwang |
| 5,371,636 A | 12/1994 | Nayak et al. |
| 5,379,283 A | 1/1995 | Miyajima |
| 5,379,710 A | 1/1995 | Parnigoni |
| 5,396,376 A * | 3/1995 | Chambors et al. ............ 360/48 |
| 5,414,578 A | 5/1995 | Lian et al. |
| 5,414,585 A | 5/1995 | Saliba |
| 5,432,652 A * | 7/1995 | Comeaux et al. ........ 360/77.12 |
| 5,448,430 A | 9/1995 | Bailey et al. |
| 5,450,257 A | 9/1995 | Tran et al. |
| 5,452,152 A | 9/1995 | Rudi |
| 5,457,586 A | 10/1995 | Solhjell |
| 5,462,823 A | 10/1995 | Evans et al. |
| 5,510,140 A | 4/1996 | Kurose et al. |
| 5,515,212 A | 5/1996 | Chiao et al. |
| 5,518,804 A | 5/1996 | Mizuno et al. |
| 5,523,904 A | 6/1996 | Saliba |
| 5,532,042 A | 7/1996 | Kawarai et al. |
| 5,535,069 A | 7/1996 | Chiao et al. |
| 5,563,868 A | 10/1996 | Farnsworth et al. |
| 5,566,033 A | 10/1996 | Frame et al. |
| 5,589,247 A | 12/1996 | Wallack et al. |
| 5,615,205 A | 3/1997 | Belser |
| 5,661,616 A | 8/1997 | Tran et al. |
| 5,661,823 A | 8/1997 | Yamaguchi et al. |
| 5,674,583 A | 10/1997 | Nakayama et al. |
| 5,675,448 A | 10/1997 | Molstad et al. |
| 5,677,806 A | 10/1997 | Eckberg et al. |
| 5,680,278 A | 10/1997 | Sawtelle, Jr. |
| 5,689,384 A | 11/1997 | Albrecht et al. |
| 5,696,755 A | 12/1997 | Leonhardt |
| 5,705,268 A | 1/1998 | Ishikawa et al. |
| 5,718,964 A | 2/1998 | Naoe et al. |
| 5,726,834 A | 3/1998 | Eckberg et al. |
| 5,774,313 A | 6/1998 | Tanaka et al. |
| 5,815,482 A | 9/1998 | Rope et al. |
| 5,855,589 A | 1/1999 | McEwen et al. |
| 5,858,589 A | 1/1999 | Govaert et al. |
| 5,872,675 A | 2/1999 | Solhjell |
| 5,877,910 A | 3/1999 | Williams et al. |
| 5,993,948 A | 11/1999 | Yamazaki et al. |
| 6,018,434 A * | 1/2000 | Saliba ..................... 360/77.13 |
| 6,033,752 A | 3/2000 | Suzuki et al. |
| 6,063,489 A | 5/2000 | Kobayashi et al. |
| 6,075,678 A | 6/2000 | Saliba |
| 6,084,740 A | 7/2000 | Leonhardt et al. |
| 6,103,365 A | 8/2000 | Ishii et al. |
| 6,108,159 A | 8/2000 | Nute et al. |
| 6,236,529 B1 | 5/2001 | Leonhardt et al. |
| 6,246,535 B1 | 6/2001 | Saliba et al. |
| 6,275,349 B1 * | 8/2001 | Smith ..................... 360/77.03 |
| 6,480,351 B2 * | 11/2002 | Leonhardt et al. ........ 360/77.12 |
| 6,549,360 B1 * | 4/2003 | Xuan et al. ................ 360/72.1 |
| 2001/0006437 A1 | 7/2001 | Leonhardt et al. |

FOREIGN PATENT DOCUMENTS

| | | |
|---|---|---|
| DE | 32 01 935 | 8/1983 |
| DE | 34 17 426 | 11/1985 |
| DE | 41 42 052 | 7/1992 |
| EP | 0 069 548 | 1/1983 |
| EP | 0 083 753 | 7/1983 |
| EP | 0 097 774 | 1/1984 |
| EP | 0 108 258 | 5/1984 |
| EP | 0 119 568 | 9/1984 |
| EP | 0 130 495 | 1/1985 |
| EP | 0 155 000 | 9/1985 |
| EP | 0 166 199 | 1/1986 |
| EP | 0 177 737 | 4/1986 |
| EP | 0 180 258 | 5/1986 |
| EP | 0 189 948 | 8/1986 |
| EP | 0 244 005 | 11/1987 |
| EP | 0 257 713 | 3/1988 |
| EP | 0 311 485 | 4/1989 |
| EP | 0 311 859 | 4/1989 |
| EP | 0 336 419 | 10/1989 |
| EP | 0 344 759 | 12/1989 |
| EP | 0 347 074 | 12/1989 |
| EP | 0 351 837 | 1/1990 |
| EP | 0 353 007 | 1/1990 |
| EP | 0 368 268 | 5/1990 |
| EP | 0 368 269 | 5/1990 |
| EP | 0 390 555 | 10/1990 |
| EP | 0 423 662 | 4/1991 |
| EP | 0 434 230 | 6/1991 |
| EP | 0 443 810 | 8/1991 |
| EP | 0 535 112 | 12/1991 |
| EP | 0 484 774 | 5/1992 |
| EP | 0 484 775 | 5/1992 |
| EP | 0 484 779 | 5/1992 |
| EP | 0 484 780 | 5/1992 |
| EP | 0 496 132 | 7/1992 |
| EP | 0 496 461 | 7/1992 |
| EP | 0 549 845 | 7/1993 |
| EP | 0 549 854 | 7/1993 |
| EP | 0 555 511 | 8/1993 |
| EP | 0 564 187 | 10/1993 |
| EP | 0 645 043 | 12/1993 |
| EP | 0 645 044 | 12/1993 |
| EP | 0 655 960 | 12/1993 |
| EP | 0 598 503 | 5/1994 |
| EP | 0 606 710 | 7/1994 |
| EP | 0 684 597 | 11/1995 |

| | | |
|---|---|---|
| EP | 0 854 471 | 7/1998 |
| EP | 1 026 665 | 8/2000 |
| EP | 1 026 666 | 8/2000 |
| EP | 1 026 667 | 8/2000 |
| EP | 1 117 092 | 7/2001 |
| EP | 1 205 912 | 5/2002 |
| EP | 1 205 913 | 5/2002 |
| FR | 2 315 142 | 1/1977 |
| GB | 2 008 290 | 5/1979 |
| GB | 1 595 136 | 8/1981 |
| GB | 2 121 227 | 12/1983 |
| GB | 2 335 785 | 9/1999 |
| JP | 56-111169 | 9/1981 |
| JP | 57-050346 | 3/1982 |
| JP | 57-120230 | 7/1982 |
| JP | 57-120255 | 7/1982 |
| JP | 61-142530 | 6/1986 |
| JP | 61-293372 | 12/1986 |
| JP | 62-192025 | 8/1987 |
| JP | 63-148416 | 6/1988 |
| JP | 63-251924 | 10/1988 |
| JP | 64-070916 | 3/1989 |
| JP | 2-169915 | 6/1990 |
| JP | 3-094881 | 4/1991 |
| JP | 3-141087 | 6/1991 |
| JP | 3-201215 | 9/1991 |
| JP | 3-219432 | 9/1991 |
| JP | 3-242816 | 10/1991 |
| JP | 4-003832 | 1/1992 |
| JP | 4-038632 | 2/1992 |
| JP | 4-059399 | 2/1992 |
| JP | 4-252417 | 9/1992 |
| JP | 4-305844 | 10/1992 |
| JP | 5-073883 | 3/1993 |
| JP | 6-020414 | 1/1994 |
| JP | 6-139549 | 5/1994 |
| JP | 6-243619 | 9/1994 |
| JP | 6-259736 | 9/1994 |
| JP | 7-029136 | 1/1995 |
| JP | 7-057412 | 3/1995 |
| JP | 7-065434 | 3/1995 |
| JP | 7-220255 | 8/1995 |
| JP | 7-082626 | 9/1995 |
| JP | 7-508119 | 9/1995 |
| JP | 8-174669 | 7/1996 |
| JP | 9-007131 | 1/1997 |
| JP | 9-033773 | 2/1997 |
| JP | 9-035246 | 2/1997 |
| JP | 9-288813 | 9/1997 |
| JP | 9-293230 | 9/1997 |
| JP | 9-265626 | 10/1997 |
| JP | 9-289885 | 11/1997 |
| JP | 9-289973 | 11/1997 |
| JP | 9-297914 | 11/1997 |
| JP | 9-320197 | 12/1997 |
| JP | 10-043924 | 2/1998 |
| JP | 10-190867 | 7/1998 |
| JP | 10-251432 | 9/1998 |
| JP | 10-297181 | 11/1998 |
| JP | 11-066529 | 3/1999 |
| JP | 11-066745 | 3/1999 |
| JP | 11-096705 | 4/1999 |
| JP | 11-126328 | 5/1999 |
| JP | 11-154312 | 6/1999 |
| JP | 11-161928 | 6/1999 |
| JP | 11-213383 | 8/1999 |
| JP | 11-213384 | 8/1999 |
| JP | 11-242814 | 9/1999 |
| JP | 11-339254 | 12/1999 |
| JP | 11-353642 | 12/1999 |
| JP | 2001-048351 | 2/2001 |
| JP | 2001-067652 | 3/2001 |
| JP | 2001-076326 | 3/2001 |
| KP | 9406847 | 7/1994 |
| SU | 1137513 | 1/1985 |
| WO | WO 83/01858 | 5/1983 |
| WO | WO 85/02933 | 7/1985 |
| WO | WO 85/03376 | 8/1985 |
| WO | WO 88/02168 | 3/1988 |
| WO | WO 94/12975 | 6/1994 |
| WO | WO 99/21178 | 4/1999 |
| WO | WO 99/21179 | 4/1999 |
| WO | WO 9/28909 | 6/1999 |
| WO | WO 99/27530 | 6/1999 |
| WO | WO 00/49604 | 8/2000 |
| WO | WO 00/49605 | 8/2000 |
| WO | WO 00/49607 | 8/2000 |

* cited by examiner

METHOD OF WRITING SERVO SIGNAL ON MAGNETIC TAPE

TECHNICAL FIELD

The present invention relates to a method and an apparatus for writing servo signals on a magnetic tape, by which a large number of servo tracks having a small pitch can be formed at a time.

BACKGROUND ART

One of means for increasing the recording capacity of a magnetic tape is to increase the density of data tracks. However, as the track density increases, the distance between adjacent data tracks is shortened, and it becomes more likely that the magnetic head strays off the right position during data recording or reproduction, failing to keep accuracy of recording or reproduction. In order to achieve accurate recording or reproduction by preventing such positional deviation from happening, various servo tracking systems have been proposed.

One of the servo tracking systems for magnetic tape that has been proposed is forming servo tracks corresponding to servo signals on a magnetic tape magnetically or by mechanical stamping. According to this system, the smaller the distance between servo tracks formed, the more accurate the servo control. To achieve this, however, a complicated or large-sized apparatus is required for servo signal writing, which is followed by an increased production cost.

Accordingly, an object of the present invention is to provide a method and an apparatus for writing servo signals on a magnetic tape which will make it possible to form a large number of servo tracks at a small pitch simultaneously.

DISCLOSURE OF THE INVENTION

The present invention accomplishes the above object by providing a method of writing servo signals on a magnetic tape, which comprises making a single laser beam pass through a diffraction element to split it into a plurality of beams traveling in prescribed directions and then making the plurality of beams pass through an optical convergence system to form converged beam spots on a site of a magnetic tape which is capable of forming servo tracks, the magnetic tape being running at a prescribed speed, to cause the site to change physically or chemically thereby forming a plurality of servo tracks in the longitudinal direction of the tape simultaneously.

The present invention also provides an apparatus for writing servo signals on a magnetic tape, which is preferably used to carry out the above-mentioned method, which comprises a system for running a magnetic tape, a light source system for splitting a single laser beam into a plurality of beams, and an optical system for forming the plurality of beams into converged beam spots aligned at a prescribed interval on a prescribed site of the magnetic tape, wherein the light source system has a light source emitting the laser beam and a diffraction element which splits the laser beam into a plurality of coplanar beams making equal divergent angles with each other, the diffraction element being disposed so that the direction in which the converged beam spots are aligned and the running direction of the magnetic tape may make an angle larger than 0° and smaller than 90°.

BEST MODE FOR CARRYING OUT THE INVENTION

Figure 1:
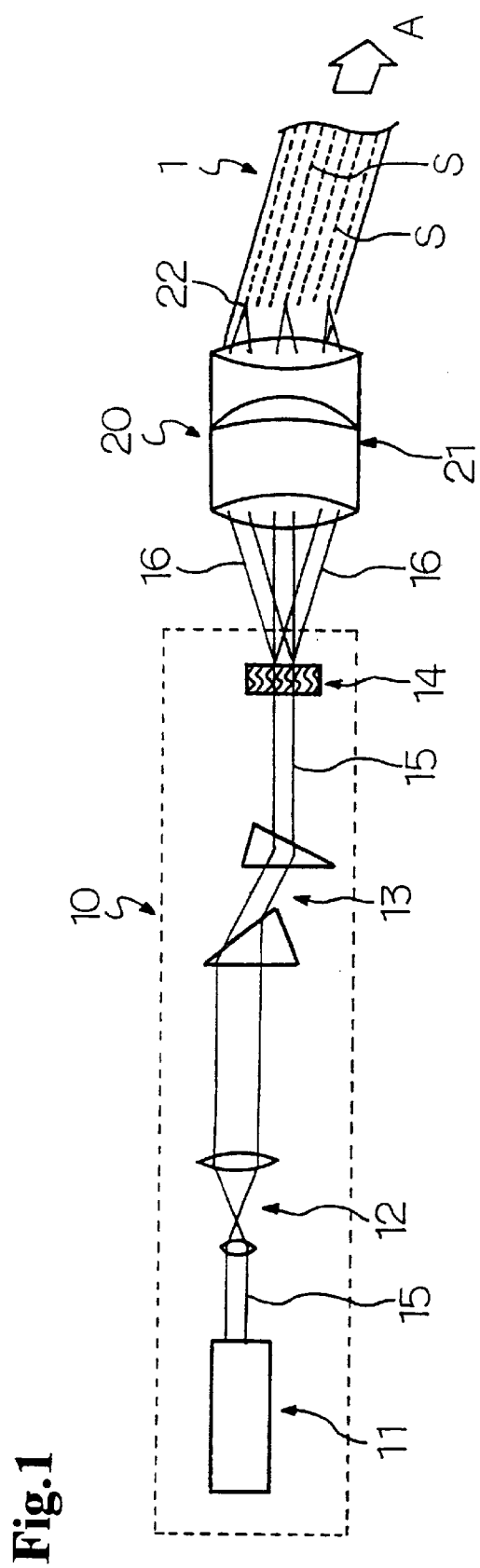
FIG. 1 schematically illustrates an embodiment of the servo signal writing apparatus which can be used to carry out the method of the present invention.

The present invention will be hereunder described with reference to its preferred embodiment by way of the accompanying drawings. FIG. 1 schematically illustrates an embodiment of the servo signal writing apparatus which can be used to carry out the method of the present invention. The apparatus shown has a magnetic tape running system (not shown), a light source system 10, and an optical system 20.

The magnetic tape running system comprises a feed reel having a magnetic tape, on which servo tracks are to be formed, wound therearound, a take-up reel for taking up the fed magnetic tape, and a driving means for revolving these reels. These members are set to make magnetic tape 1 run in direction A. Such a running system has the same mechanism as that in a conventional magnetic tape recording and reproducing drive. While not shown, the running system also has a means for regulating either edge of the running magnetic tape 1, by which fluctuation of the running magnetic tape 1 in the width direction may be prevented thereby to keep the distance from that edge to each servo track constant.

The light source system 10, which is to split a single laser beam 15 into a plurality of split beams 16, comprises a light source 11 for emitting a laser beam, a beam expander 12, an anamorphic prism 13, and a diffraction element 14.

Various lasers can be used as the light source 11. A pulse laser is preferably used to minimize the damage to the thin magnetic tape, which is the object of laser machining. Pulse lasers that have a sufficient output and are relatively inexpensive include the second harmonic waves of a $YVO_4$ laser, a YAG laser and a YLF laser, etc. It is particularly preferred to use a $YVO_4$ laser that is capable of high frequency drive and short pulse oscillation to minimize the damage to the magnetic tape.

The beam expander 12 is to expand the diameter of the laser beam 15 emitted from the light source 11 thereby to reduce the diameter of converged beam spots 22 which are finally formed on the magnetic tape 1. The anamorphic prism 13 is to make the circular beam form of the laser beam 15 expanded by the beam expander 12 into an elliptic beam form for obtaining a pattern of elliptic dots.

Figure 2:
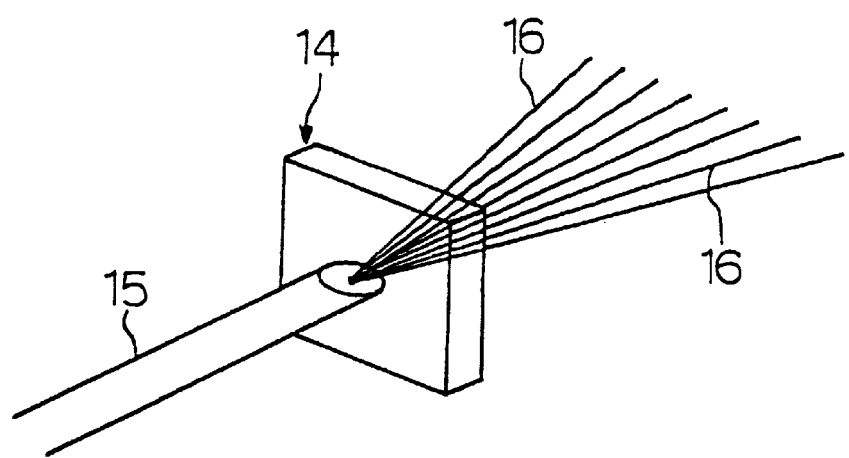
FIG. 2 schematically shows the way of a laser beam's being split by a diffraction element.

The diffraction element 14 receives the laser beam 15, and lets it pass therethrough to split it into a plurality of beams 16, 16 . . . traveling from the position of passage in prescribed directions. Such a diffraction element is of a beam splitting type. The pattern formed by the split laser beams includes a dot-line in which beams are aligned in a straight line, a dot-matrix in which the beams are arranged in a matrix, a multi-line made of a plurality of lines, a cross, and concentric circles. To form a number of servo tracks at a time, a dot-line type or a dot-matrix type diffraction element is preferably used. The present embodiment uses a dot-line type diffraction element by which an incident laser beam 15 is split into a plurality of beams which are coplanar, making equal divergent angles with each other as shown in FIG. 2.

The optical system 20 is constructed of an optical convergence system. The plurality of split beams 16 obtained by splitting the laser beam 15 by the diffraction element 14 of the light source system 10 are converged through this optical system 20 to form simultaneously as many converged beam spots 22 on the magnetic tape 1 in a site capable of forming servo tracks. The optical convergence system has a condenser lens. A condenser lens capable of providing a flat focal plane, for example, an fθ lens, an anamorphic condenser lens, or a spherical condenser lens, can be used. In this embodiment, an fθ lens is used for its capability of forming servo tracks over a wide range in the width direction of the magnetic tape 1 through a single operation.

An fθ lens is capable of preventing the focal plane from curving according to the angle of incidence upon the lens to provide a flat focal plane over a broad range. In particular, an fθ lens is extremely effective in forming servo tracks over a range of 1 mm or more, especially 5 mm or more, in the width direction of the magnetic tape through a single operation. The details of an fθ lens are described, e.g., in *Laser Kyokai (ed.), Laser Ohyo Gijutu Handbook* (5th Ed.), Asakura Shoten, Aug. 10, 1991.

The method of forming servo tracks on the magnetic tape 1 by use of the above-described apparatus is described below. The light source 11 for a laser beam 15 in the light source system 10 shown in FIG. 1 oscillates to generate a single laser beam 15 having a prescribed pulse width. The oscillation wavelength of the laser beam is selected appropriately according to the material making the site of the magnetic tape 1 which is capable of forming servo tracks and the like. From the standpoint of the cost of the laser and reliability, a wavelength of 532 nm is usually used. The laser beam 15 usually has a diameter of 0.1 to 1 mm. The energy of the laser beam 15 per pulse is preferably 1 to 100 nJ, particularly 5 to 50 nJ, for a single dot pattern, taking into consideration capability of forming a requisite and adequate dot pattern for servo tracking without doing serious damage to the magnetic tape. From the viewpoint of productivity the frequency is preferably as high as is consistent with stability of the laser output. Specifically, a preferred frequency is 1 to 100 kHz, particularly 20 to 50 kHz. The pulse width is preferably as small as possible to suppress damage to the tape. Specifically, a preferred pulse width is 1 to 100 ns, especially 5 to 20 ns.

After the laser beam 15 has been expanded to a prescribed diameter by the beam expander 12, the circular beam form of the laser beam 15 is configured into an elliptic form by the anamorphic prism 13. The magnifying power of the beam expander 12 is preferably about 4 to 40, and the ratio of contraction (aspect ratio) by the anamorphic prism 13 is preferably about 1:1 to 1:10.

The laser beam 15 having been so configured through the anamorphic prism 13 then enters the diffraction element 14 of dot-line type. Having passed through the diffraction element 14, the laser beam 15 is split into a plurality of split beams 16, 16 . . . which diverge coplanarly at equal divergent angles with each other as shown in FIG. 2.

The divergent angle θ among split beams 16 obtained by the dot line type diffraction element 14 depends on the pattern period of the diffraction element. Too narrow or too wide a divergent angle θ results in non-uniformity in output among the split beams. A preferred divergent angle θ is about 1 to 100 mrad. The number of beams into which the laser beam 15 is split, being related to the divergent angle θ, is preferably about 15 to 300 for making a great number of servo tracks at a time.

Each split beam 16 incident on an fθ lens 21 as a condenser lens of the optical system 20 is converged while passing therethrough, whereby converged beam spots 22 corresponding to the respective split beams 16 are simultaneously formed on the site, which is capable of forming servo tracks, of the magnetic tape 1 running at a prescribed speed. From the standpoint of productivity, the running speed of the magnetic tape 1 is preferably as high as possible but, with the ability of the running system being taken into consideration, a practically suitable speed is about 1 to 5 m/sec.

Since the fθ lens makes the focal plane of the converged beam spots 22 flat as stated previously, the converged beam spots 22, 22 . . . are aligned straight at a prescribed interval on the above-described site of the magnetic tape 1. In the present embodiment where the laser beam 15 is split by the dot-line type diffraction element 14, alignment of the converged beam spots 22 is at a regular interval. The spacing between every adjacent converged beam spots 22 and 22 is decided by the product of the focal length f of the fθ lens and the divergent angle θ (rad) of the laser beam 15 split by the diffraction element 14, i.e., f×θ. The spacing between the converged beam spots 22 and 22, which can be adjusted by properly selecting the fθ lens and the diffraction element 14, is preferably 1 μm to 5 mm, particularly 3 μm to 2.5 mm. The focal length f of the fθ lens is preferably about 10 to 50 mm, and the aperture of the fθ lens is preferably about 15 to 100 mm.

The site of the magnetic tape 1 on which the converged beam spots 22 are formed undergoes a physical or chemical change to form a plurality of servo tracks along the longitudinal direction of the tape at a time. For making a plurality of servo tracks over a wide range in one operation, it is preferred for the focal plane to extend over a width of 1 to 15 mm in the width direction of the magnetic tape 1. The form of the individual converged beam spots 22 formed on the site is preferably a circle having a radius of about 0.5 to 5 μm or an ellipse having a major or minor axis falling within that range. In the present embodiment, since the laser beam 15 has its form configured into an ellipse by the anamorphic prism 13, the form of the converged beam spots 22 is also elliptic.

The alignment direction of the converged beam spots 22 may be at right angles with the running direction of the magnetic tape 1 or be tilted so that these directions forms an angle larger than 0° and smaller than 90°. The alignment direction of the converged beam spots 22 can be changed appropriately by adjusting the direction of arrangement of the diffraction element 14.

Figure 3:
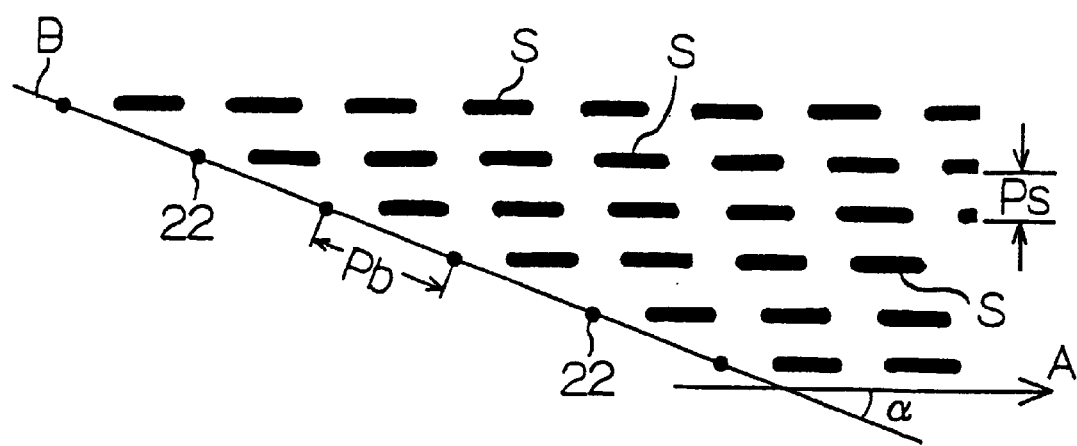
FIG. 3 is a schematic plan view of a magnetic tape on which servo tracks are being formed.

When the diffraction element 14 is arranged so that the converged beam spots 22 alignment direction and the magnetic tape 1 running direction may make a right angle, the pitch Ps of the formed servo tracks is equal to the spacing Pb between converged beam spots 22 and 22. On the other hand, when the diffraction element 14 is arranged so that the converged beam spots 22 alignment direction B is tilted making an angle of α with the magnetic tape running direction A as shown in FIG. 3, the pitch Ps of the formed servo tracks S and S is equal to Pbsinα. This means that the pitch Ps of the formed servo tracks S and S is sin α times the spacing Pb of the converged beam spots 22 and 22, that is, a plurality of servo tracks S may be formed simultaneously at a smaller pitch. The angle α can be set appropriately according to the spacing Pb between the converged beam spots 22 and 22, the pitch Ps between the formed servo tracks S and S, and the like.

The dot pattern of each servo track S is discrete and linear in the longitudinal direction of the magnetic tape 1 as shown in FIG. 3. The dot shape of adjacent servo tracks may be the same or different. It is not always necessary to form the servo tracks over the whole length of the magnetic tape 1.

An exemplary magnetic tape to which the method of the present invention is applied and usage of servo tracks formed on that magnetic tape will be explained briefly. The magnetic tape comprises a substrate, a magnetic or nonmagnetic intermediate layer formed on the substrate, and a magnetic layer provided on the intermediate layer as a top layer. The substrate has on the other side a backcoating layer. The magnetic layer has formed thereon a plurality of data tracks in parallel to the magnetic tape running direction. In order to reduce the influences on magnetic recording, it is preferred, but it not limitative, to use the backcoating layer as the site capable of forming servo tracks. Any other layer or the substrate may be used, or a dedicated site may be provided separately.

On forming the converged beam spots 22, the site capable of forming servo tracks forms a dot pattern corresponding to servo signals, that is, servo signals are written on that site, to produce an optical contrast with the non-irradiated part. While not limiting, the means of forming an optical contrast with the dot pattern includes (1) formation of depressions having a prescribed depth on the surface of the site, for example, the backcoating layer by irradiation with the converged beam spots 22 (physical change) and (2) incorporation into the site a substance capable of color change on receipt of the convergent spots 22 (chemical change).

When the above-described magnetic tape is used, a multichannel head unit having a predetermined number of magnetic heads is moved across the magnetic tape, switching among data tracks, to record or reproduce data on the data track corresponding to each magnetic head. Servo tracking for the head unit is carried out based on the servo tracks formed on the magnetic tape so that each magnetic head may be positioned on a right data track when a switch is made among the data tracks or during recording or reproduction. For example, the servo track pattern is irradiated with light of prescribed wavelength, and the reflected light or transmitted light is detected to optically read the servo signals. Servo tracking is carried out based on the read servo signals in the same manner as a push-pull method, etc. that is conventionally used in the field of optical disks, etc.

The present invention is not limited to the above-described embodiment. For example, the dot-line type diffraction element 24 used in the above embodiment can be replaced with a dot-matrix type diffraction element. Where the focal plane is relatively small, an anamorphic condensing lens can be used as a condensing lens 21 in place of the fθ lens. Further, the circular laser beam 15 may be converged as it is without being converted to an elliptic beam.

EXAMPLE 1

Servo tracks were formed on a magnetic tape by the use of the apparatus shown in FIG. 1. The magnetic tape comprised a 6 $\mu$m thick polyethylene terephthalate substrate having formed thereon a 1.5 $\mu$m thick magnetic intermediate layer and a 0.2 $\mu$m thick uppermost magnetic layer in this order and having formed on the back side thereof a 0.5 $\mu$m thick backcoating layer and had a width of 12.7 mm. The servo tracks were formed on the backcoating layer of the magnetic tape under the following conditions.

(1) Light source
   Solid state pulse laser $YVO_4$
   Oscillation wavelength: 532 nm
   Beam diameter: 0.7 mm
   Average output: 1.2 W
   Frequency: 50 kHz
   Pulse width: 10 ns (2) Beam expander
   Magnifying power: 16
(3) Anamorphic prism
   Aspect ratio: 1:5
(4) Diffraction element
   Equally spaced-dot type
   Divergent angle: 1 mrad
   Number of split beams: 100
(5) Condenser lens
   fθ lens
   Range of focal plane: 13 mm
   Aperture: 61 mm
   Focal length: 35 mm
   Converged beam spot configuration: ellipse (3 $\mu$m×8 $\mu$m)

Servo tracks were formed on the backcoating layer of the magnetic tape under the above-described conditions with the direction of the diffraction grating being adjusted so that the converged beam spots aligned at a regular interval (35 mm×1 mrad=35 $\mu$m) might be tilted at an angle of 34.8° with the magnetic tape running direction as shown in FIG. 3. The running speed of the magnetic tape was 5 m/sec. As a result, there were formed simultaneously servo tracks in the longitudinal direction of the magnetic tape and over a width of about 2 mm in the direction of the tape width, each servo track being made in a pattern of dots having a width of 2 $\mu$m, a length of 6 $\mu$m, a spacing of 100 $\mu$m between dots in the tape length direction and a track pitch of 20 $\mu$m in the tape width direction.

Industrial Applicability

According to the present invention, a large number of servo tracks can be formed on a magnetic tape at a small pitch simultaneously and easily. Therefore, the magnetic tape produced according to the present invention is capable of servo control with improved accuracy, and it is possible to increase the data track density, which will increase the recording capacity.

What is claimed is:

1. A method of writing servo signals on magnetic tape which comprises making a single laser beam pass through a diffraction element to split it into a plurality of beams traveling in prescribed directions and then making said plurality of beams pass through an optical convergence system to form converged beam spots on a site of a magnetic tape which is capable of forming servo tracks, said magnetic tape being running at a prescribed speed, to cause said site to change physically or chemically thereby forming a plurality of servo tracks in the longitudinal direction of the tape simultaneously.

2. The method of writing servo signals on magnetic tape according to claim 1, wherein said optical convergence system comprises an fθ lens.

3. The method of writing servo signals on magnetic tape according to claim 1, wherein said laser beam is split by said diffraction element into a plurality of coplanar beams making equal divergent angles with each other, and said beams, while passing through said optical convergence system, are formed into said converged beam spots aligned at a prescribed interval.

4. The method of writing servo signals on magnetic tape according to claim 3, wherein said converged beam spots are formed in such a manner that the direction in which said converged beam spots are aligned and the running direction of said magnetic tape make an angle larger than 0° and smaller than 90°.

5. An apparatus for writing servo signals on a magnetic tape which comprises a system for running a magnetic tape, a light source system for splitting a single laser beam into a plurality of beams, and an optical system for forming said plurality of beams into converged beam spots aligned at a prescribed interval on a prescribed site of said magnetic tape, wherein said light source system has a light source emitting said laser beam and a diffraction element which splits said laser beam into a plurality of coplanar beams making equal divergent angles with each other, said diffraction element being disposed so that the direction in which said converged beam spots are aligned and the running direction of said magnetic tape may make an angle larger than 0° and smaller than 90°.

* * * * *